United States Patent
Zhang et al.

(10) Patent No.: US 11,644,970 B2
(45) Date of Patent: May 9, 2023

(54) NUMBER INPUT METHOD, APPARATUS, AND STORAGE MEDIUM

(71) Applicant: Airstar Digital Technology Co., Ltd., Beijing (CN)

(72) Inventors: Xu Zhang, Beijing (CN); Yu Cheng, Beijing (CN)

(73) Assignee: AIRSTAR DIGITAL TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/232,072

(22) Filed: Apr. 15, 2021

(65) Prior Publication Data

US 2022/0066632 A1 Mar. 3, 2022

(30) Foreign Application Priority Data

Aug. 27, 2020 (CN) .......................... 202010881248.9

(51) Int. Cl.
*G06F 3/04847* (2022.01)
*G06F 3/04886* (2022.01)
*G06F 3/0481* (2022.01)

(52) U.S. Cl.
CPC ........ *G06F 3/04886* (2013.01); *G06F 3/0481* (2013.01); *G06F 3/04847* (2013.01)

(58) Field of Classification Search
CPC .............. G06F 3/04886; G06F 3/0481; G06F 3/04847; G06F 3/0236; G06F 3/04883; G06F 3/0233
See application file for complete search history.

(56) References Cited

U.S. PATENT DOCUMENTS

2006/0061572 A1\* 3/2006 Phelan .................. G06T 11/206
 345/440
2010/0156830 A1\* 6/2010 Homma .............. G06F 3/04847
 345/173
(Continued)

FOREIGN PATENT DOCUMENTS

CN 104020944 A 9/2014
CN 107132972 A 9/2017
EP 2378402 A1 10/2011

OTHER PUBLICATIONS

Chinese Patent Application No. 202010881248.9, Office Action dated Aug. 6, 2021, 5 pages.
(Continued)

*Primary Examiner* — Jennifer N Welch
*Assistant Examiner* — Kuang F Chen
(74) *Attorney, Agent, or Firm* — Cozen O'Connor

(57) ABSTRACT

The present disclosure relates to a number input method, a number input apparatus and a storage medium. The number input method is applied to a terminal, the method includes: displaying a number input control, wherein the number input control comprises a number axis, and the number axis comprises a first axis scale; receiving a first touch operation on the number axis, and switching the first axis scale to a second axis scale in response to the first touch operation meeting a preset condition; and receiving a second touch operation on the number axis, and determining a target number according to a position on the second axis scale corresponding to the second touch operation, and displaying the target number.

7 Claims, 5 Drawing Sheets

(56) References Cited

U.S. PATENT DOCUMENTS

| | | | |
|---|---|---|---|
| 2013/0093709 A1 | 4/2013 | Fujibayashi | |
| 2013/0293503 A1* | 11/2013 | Zhou | G06F 3/04883 345/173 |
| 2015/0058801 A1* | 2/2015 | John | G06F 3/04847 715/801 |
| 2015/0143291 A1* | 5/2015 | Zha | G06F 3/04883 715/810 |
| 2015/0208205 A1* | 7/2015 | Chan | H04L 67/1095 709/217 |
| 2017/0269825 A1* | 9/2017 | Wu | G06F 3/04847 |

OTHER PUBLICATIONS

Chinese Patent Application No. 202010881248.9, English translation of Office Action dated Aug. 6, 2021, 7 pages.
European Patent Application No. 21170848.2, extended Search and Opinion dated Oct. 26, 2021, 9 pages.

* cited by examiner

NUMBER INPUT METHOD, APPARATUS, AND STORAGE MEDIUM

CROSS-REFERENCE TO RELATED APPLICATION

The present application is based upon and claims priority to Chinese Patent Application No. 202010881248.9, filed on Aug. 27, 2020, the entire contents of which are incorporated herein by reference.

TECHNICAL FIELD

The present disclosure relates to graphical user interfaces (GUIs), and in particular, to GUIs for entering a number, a number input method, a number input apparatus and a storage medium.

BACKGROUND

Text fields are the most basic form of control in interface design. They are also a core component of most forms, which are a long-standing and classic interactive control. The most basic function of the text fields is to help users enter or copy and paste texts and numbers. A prototype of the text fields in physical reality comes from a paper form unit, and the basic composition also includes title tags, filled text fields and auxiliary instructions. The conceptual model of the text fields is applied to a PC interface, and information input is carried out through hardware keyboard and applied to existing mobile devices through direct touch interaction. In this evolutionary process, the text fields as an interface control has been given more interactive attributes, such as a placeholder prompt copy, an initial value, and a clear and desensitization button.

SUMMARY

Embodiments of this disclosure provide a number input method, a number input apparatus and a storage medium.

Embodiments of the disclosure provide a number input method. The number input method is applied to a terminal, the method includes: displaying a number input control, in which the number input control includes a number axis, and the number axis includes a first axis scale; receiving a first touch operation on the number axis, and switching the first axis scale to a second axis scale in response to the first touch operation meeting a preset condition; and receiving a second touch operation on the number axis, and determining a target number according to a position on the second axis scale corresponding to the second touch operation, and displaying the target number.

Embodiments of the disclosure provide a number input apparatus. The number input apparatus is applied to a terminal, the number input apparatus includes: one or more processors; a memory storing instructions executable by the one or more processors; in which the one or more processors are configured to: display a number input control, in which the number input control includes a number axis, and the number axis includes a first axis scale; receive a first touch operation on the number axis, and to switch the first axis scale to a second axis scale in response to the first touch operation meeting a preset condition; receive a second touch operation on the number axis, and to determine a target number according to a position on the second axis scale corresponding to the second touch operation, and to display the target number.

Embodiments of the disclosure provide a non-transitory computer-readable storage medium storing computer-executable instructions, the computer instructions are configured to cause a processor to implement the number input method of the present disclosure. The method includes: displaying a number input control, in which the number input control includes a number axis, and the number axis includes a first axis scale; receiving a first touch operation on the number axis, and switching the first axis scale to a second axis scale in response to the first touch operation meeting a preset condition; and receiving a second touch operation on the number axis, and determining a target number according to a position on the second axis scale corresponding to the second touch operation, and displaying the target number.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a portion of the specification and illustrate embodiments in accordance with the disclosure, and the drawings together with the specification are used to explain the principle of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The technical solution of the exemplary embodiment of the present disclosure is applied to an application scenario where a number is input in an input box of a terminal. In the exemplary embodiments, the terminal is sometimes referred to as a smart terminal device, the terminal may be a mobile terminal, or may be called a User Equipment (UE) and a Mobile Station (MS). The terminal is a device that provides users with voice and/or data connections, or is a chip set in the device, such as, a handheld device with a wireless connection function and a vehicle-mounted device. For example, terminals may include: mobile phones, tablet computers, notebook computers, handheld computers, Mobile Internet Devices (MID), wearable devices, Virtual Reality (VR) devices, and Augmented Reality (AR) devices, wireless terminals in industrial control, wireless terminals in unmanned driving, wireless terminals in remote surgery, wireless terminals in smart grids, wireless terminals in transportation safety, wireless terminals in smart cities, and wireless terminals in smart homes.

In the related art, when a terminal performs number input, a digital keyboard needs to be displayed in an input box of the interface, and the user clicks on numbers on the digital keyboard to perform corresponding input. However, in some application scenarios, it is often necessary to enter a number of one hundred, one thousand, and one ten thousand. For example, when entering an amount of a financial product, the user's finger displacement path on the terminal keyboard is long, the user experience is poor, and errors are prone to occur, resulting in financial losses.

The technical solution according to the embodiments of the present disclosure may include the following beneficial effects. The number input control is displayed, and the number input control includes a number axis. When receiving a first touch operation on the number axis, the first axis scale is switched to a second axis scale in response to the first touch operation meeting a preset condition. The purpose of flexibly adjusting the number axis scale of the number input control according to the user's touch operation on the number axis, and then according to the user's individual requirements, any number precision required by the user is adjusted to meet the individual requirements of the user's number input.

Figure 1:
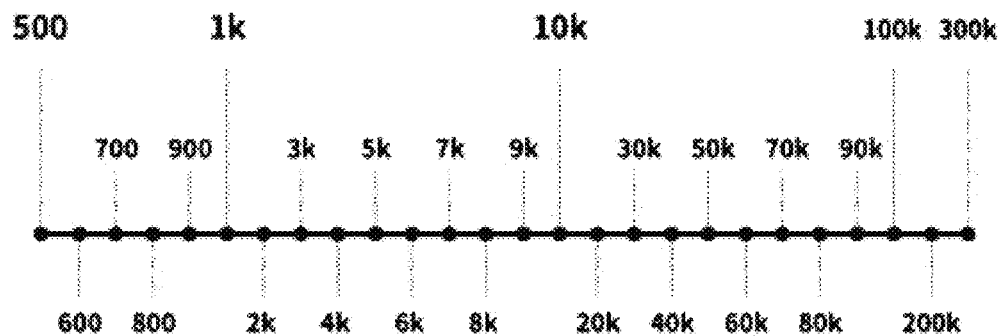
FIG. 1 is a schematic diagram of a number input interface of a number input control according to an exemplary embodiment.

When entering numbers on a numeric keyboard of a terminal, a long finger displacement path may cause poor user experience and possible financial loss caused by entering more or less than one zero. As illustrated in FIG. 1, in the related art, a number may instead be input through a number input control including a number axis, where the input is completed by touching the number axis.

However, in the number input method shown in FIG. 1, the axis scale of the number axis adopts a fixed and non-equal division method. Although input requirements of most users for numbers are met, when it is necessary to input a number with a smaller scale than a number in FIG. 1 or a number with a larger scale than the number in FIG. 1, the number input method shown in FIG. 1 cannot flexibly adjust the number input scale and cannot meet the personalized number precision requirements.

The embodiment of the present disclosure provides a number input method. In the number input method of the present disclosure, a number input control including a number axis is displayed, and when a touch operation on the number axis is received and the touch operation meets a preset condition, the current axis scale is switched to other axis scales matching the preset condition, which realizes the purpose of flexibly adjusting the number axis scale of the number input control according to the user's touch operation on the number axis, and then according to the user's individual requirements, any number precision required by the user is adjusted to meet the user's requirements on number input to improve efficiency of number input.

Figure 2:
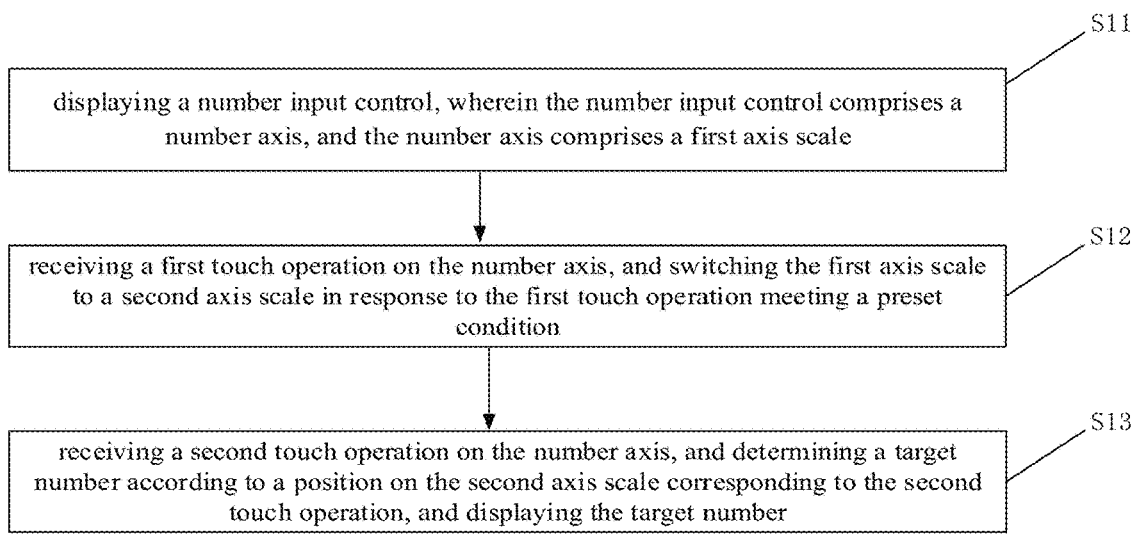
FIG. 2 is a flowchart of a number input method according to an exemplary embodiment.

FIG. 2 is a flowchart of a number input method according to an exemplary embodiment. As illustrated in FIG. 2, the number input method is applied to a terminal, and the method includes the following steps.

At step S11, a number input control is displayed, the number input control includes a number axis, and the number axis includes a first axis scale.

In an embodiment, when an application is running on the terminal, the number input control is called and displayed according to a number input scene triggered by the user, so that the user controls the number input according to the number axis displayed by the number input control. Applications may include applications that trigger entry into a number input scenario, for example, the application may be a game application, a palm banking application or a stock application.

In an embodiment, in different number input scenarios, different settings are made for unit scale of the number axis in the number input control. For convenience of description in the present disclosure, default unit scale of the number axis in the number input control is referred to as the first axis scale for different number input scenarios.

In the present disclosure, the number axis includes a first end point and a second end point, the first end point represents the smallest number on the number axis, and the second end point represents the largest number on the number axis, and the first touch operation includes a touch operation on any one of the first end point and the second end point.

At step S12, a first touch operation on the number axis is received, and the first axis scale is switched to a second axis scale in response to the first touch operation meeting a preset condition.

In the present disclosure, the touch operation on the number axis may include a sliding operation on the number axis or a touch operation on the number axis, or the touch operation after the sliding operation on the number axis.

In order to achieve the purpose of flexibly adjusting the axis scale of the number input control and meet the user's personalized input requirements, in an embodiment, the touch operation on the number axis is detected, and when the touch operation meets the preset condition, the current axis scale (i.e., the first axis scale) is switched to another axis scale (i.e., the second axis scale) that matches the preset condition. The second axis scale after switching may have an accuracy larger than an accuracy of the first axis scale or have an accuracy less than an accuracy of the first axis scale.

The preset condition that the second axis scale with an accuracy larger than an accuracy of the first axis scale is met. For example, the preset condition is met, when a sliding operation on the number axis is detected and the sliding speed of the sliding operation drops to a preset threshold, or when a sliding operation on the number axis is detected and the touch operation on the number axis is maintained after sliding, and the duration of the touch operation reaches the preset threshold, or the user does not perform the sliding operation, but continues to touch the number axis for a duration reaching the preset threshold.

At step S13, a second touch operation on the number axis is received, and a target number is determined according to a position on the second axis scale corresponding to the second touch operation, and the target number is displayed.

In the present disclosure, when the number axis included in the number input control is switched from the first axis scale to the second axis scale that matches the preset condition, for example, the target number is determined by: determining a number corresponding to a location of the first axis scale after the first touch operation is performed on the number axis; acquiring the second axis scale, and determining a number corresponding to a location of the second axis scale; and determining the target number based on the number corresponding to the location of the first axis scale and the number corresponding to the location of the second axis scale.

In the present disclosure, to distinguish the first touch operation, after the first axis scale is switched to the second axis scale, the touch operation on the number axis is called the second touch operation. The second touch operation may include a sliding operation and a click operation.

In an exemplary embodiment of the present disclosure, the number input control including a number axis is displayed, and when a touch operation on the number axis is received, and the touch operation meets the preset condition, the current axis scale is switched to other axis scale matching the preset condition. The purpose of flexibly adjusting the number axis scale of the number input control according to the user's touch operation on the number axis is realized, and then according to the user's individual requirements, any number precision required by the user is adjusted to meet the individual requirements of the user's number input.

In the following, the present disclosure describes a touch operation performed on the number axis, and the touch operation satisfies the preset condition of switching the first axis scale to a higher-precision axis scale.

Figure 3:
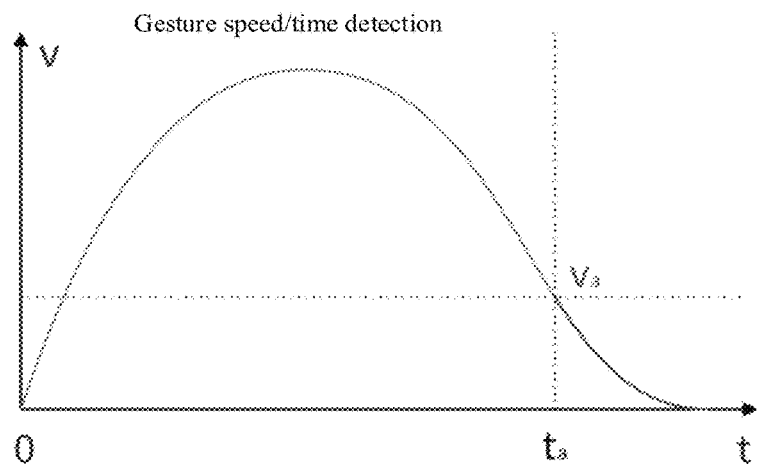
FIG. 3 is a curve graph of a correspondence between a user's gesture swiping speed and a swiping time according to an exemplary embodiment.

FIG. 3 is a curve graph of a correspondence between a user's gesture swiping speed and a swiping time according to an exemplary embodiment.

In FIG. 3, for example, a speed of swiping gesture is denoted as V, and a duration for sliding to the target number is set as t. When the user's slide operation approaches a desired area, the slide speed slowly decelerates to an inflection point speed $V_a$ before stopping. Where $t_a$ is the duration corresponding to $V_a$. When the sliding speed reaches the inflection point speed $V_a$, the number corresponding to the current number axis position is relatively close to the expected target number. Furthermore, when the preset speed threshold is equal to the inflection point speed $V_a$, the accuracy is adjusted according to the current axis scale. For example, the current axis scale is adjusted by "first gear adjustment", that is, the current axis scale is reduced by a preset order of magnitude, and the second axis scale with an accuracy larger than an accuracy of the first axis scale is obtained.

Figure 4:
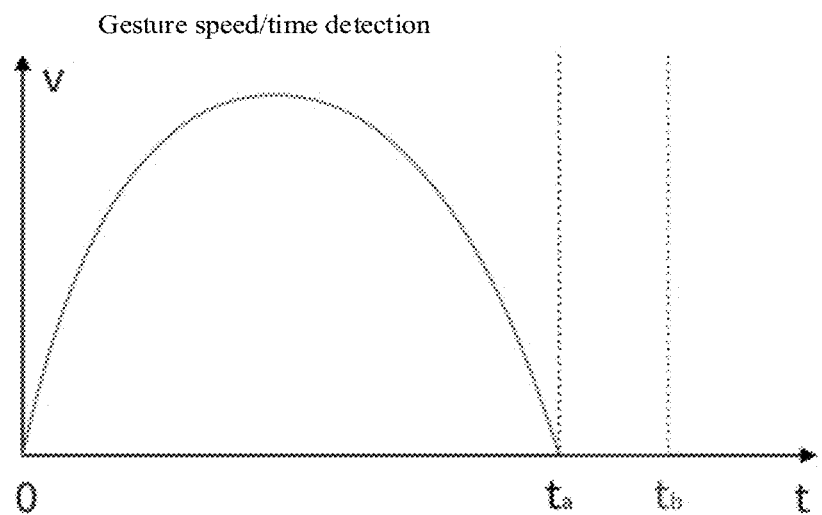
FIG. 4 is a diagram in which a touch operation on a number axis is continuously detected, and a time of the touch operation reaches a preset time threshold according to an exemplary embodiment.

FIG. 4 is a diagram in which a touch operation on a number axis is continuously detected, and a time of the touch operation reaches a preset time threshold according to an exemplary embodiment.

In FIG. 4, after detecting a sliding operation on the number axis, and maintaining the touch operation on the number axis after sliding, the touch operation continues from time $t_a$ to time $t_b$. When a duration of the touch operation $(t_b-t_a)$ reaches the preset time threshold, or the user did not perform a sliding operation, the duration of the touch operation on the number axis is from $t_a$ to the time $t_b$, when the duration of the touch operation $(t_b-t_a)$ reaches the preset time threshold, it indicates that the number corresponding to the current number axis position is relatively close to the expected target number. Furthermore, when the preset speed threshold is equal to the inflection point speed $V_a$, the accuracy is adjusted according to the current axis scale. For example, the current axis scale is adjusted by "first gear adjustment", that is, the current axis scale is reduced by the preset order of magnitude, and the second axis scale with an accuracy larger than an accuracy of the first axis scale is obtained.

For example, the current default unit scale, that is, the first axis scale is 1000. When the sliding speed of the sliding operation is detected to be reduced to a preset speed threshold, or the sliding operation on the number axis is detected, and after sliding, the touch operation on the number axis is maintained, and the duration of the touch operation reaches the preset time threshold, or the user does not perform the sliding operation, but continues to touch the number axis for the preset time threshold, and the "first gear adjustment" is adopted for the current axis scale (1000), that is, the current axis scale is reduced by the preset order of magnitude, and the second axis scale with a unit scale of 100 is obtained.

By analogy, the current default unit scale is the first axis scale (i.e., 100), when the sliding speed at which the sliding operation is detected drops to another preset speed threshold, or when the sliding operation on the number axis is detected, and when the touch operation on the number axis is maintained after sliding and the duration of touch operation reaches another preset time threshold, or the user does not perform a sliding operation, but the duration of touch operation on the number axis continues to reach another preset time threshold, after the current axis scale is adjusted by "first gear adjustment", the current axis scale (i.e., 100) is adjusted to continue to decrease by the preset order of magnitude, that is, the "second gear adjustment" is performed, so that the current axis scale is switched from 100 to the second axis scale with the axis scale of 10.

In the present disclosure, when the number axis included in the number input control is switched from the first axis scale to the second axis scale matching the preset condition, the target number is determined by: determining a number corresponding to a location of the first axis scale after the first touch operation is performed on the number axis; acquiring the second axis scale, and determining a number corresponding to a location of the second axis scale; and determining the target number based on the number corresponding to the location of the first axis scale and the number corresponding to the location of the second axis scale.

Figure 5:
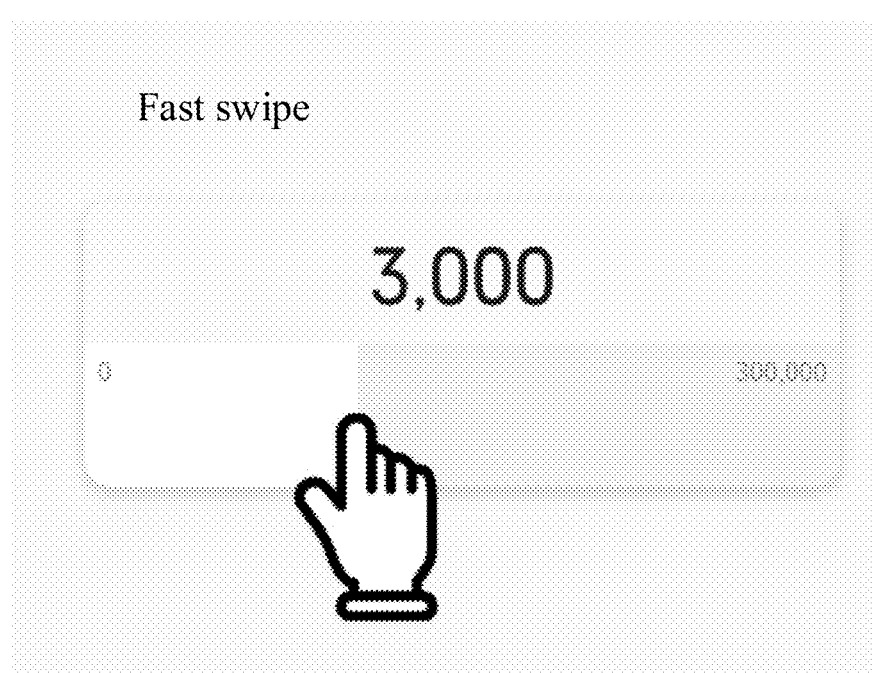
FIG. 5 is a diagram of an example of determining a target number after a number axis scale included in the number input control is switched from the first axis scale to the second axis scale, according to an exemplary embodiment.
Figure 6:
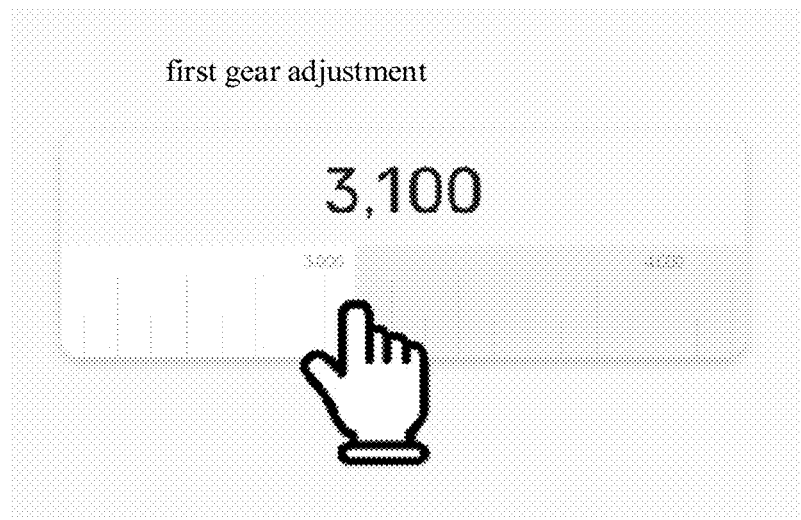
FIG. 6 is a diagram of an example of determining the target number after the number axis scale included in the number input control is switched from the first axis scale to the second axis scale, according to an exemplary embodiment.
Figure 7:
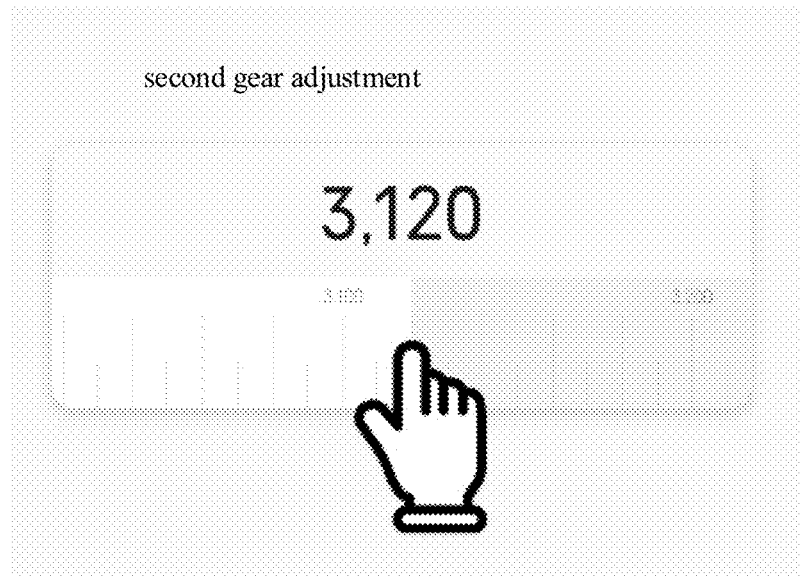
FIG. 7 is a diagram of an example of determining the target number after the number axis scale included in the number input control is switched from the first axis scale to the second axis scale, according to an exemplary embodiment.

FIGS. 5 to 7 are diagrams showing examples of determining the target number after the number axis scale included in the number input control is switched from the first axis scale to the second axis scale, according to an exemplary embodiment.

In FIG. 5, when the user quickly swipes the number axis to a number 3000, and the continuous touch operation on the number axis maintained after the sliding operation meets the preset condition, that is, when the preset time threshold is reached, the "first gear adjustment" is adopted for the current axis scale, the current axis scale 1000 is reduced by the preset order of magnitude, and the second axis scale shown in FIG. 5 with an accuracy of 100 is obtained.

In FIG. 6, the user slides the second axis scale with an accuracy of 100. For example, after the user slides to a position of 3100 corresponding to the second axis scale, the duration of touch operation of the position corresponding to the second axis scale of 3100 reaches the preset time threshold, the preset condition is met again, that is, when the preset time threshold is reached, the "second gear adjustment" is adopted for the current axis scale 100 by the preset order of magnitude, so that the current axis scale is switched from 100 to the second axis scale with the axis scale of 10.

In FIG. 7, the user slides the second axis scale with an accuracy of 10 to the position of 3120 corresponding to the second axis scale.

In the following, the present disclosure describes a touch operation performed on the number axis, and the touch operation meets the preset condition of switching the first axis scale to a lower-precision axis scale.

Figure 8:
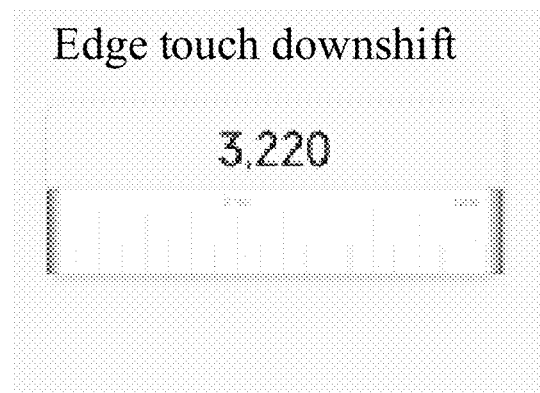
FIG. 8 is a diagram of an example of switching the first axis scale to a second axis scale with an accuracy less than an accuracy of the first axis scale according to an exemplary embodiment.
Figure 9:
FIG. 9 is a diagram of an example of switching the first axis scale to a second axis scale with an accuracy less than an accuracy of the first axis scale according to an exemplary embodiment.
Figure 10:
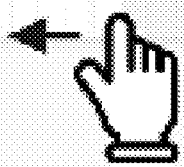
FIG. 10 is a diagram of an example of switching the first axis scale to a second axis scale with an accuracy less than an accuracy of the first axis scale according to an exemplary embodiment.

FIGS. 8-10 are exemplary diagrams of switching the first axis scale to an axis scale with an accuracy less than an accuracy of the first axis scale according to an exemplary embodiment.

In FIG. 8, when the user slides the second axis scale with an accuracy of 10 to a position of 3120 corresponding to the axis scale, for example, by continuously touching the second end point in FIG. 7, the continuous duration of the touch operation reaches the preset second time threshold, it is determined that the preset condition is satisfied, that is, the downshift adjustment shown in FIG. 9 is obtained, that is, the first axis scale is changed from 10 to the second axis scale 100. Based on the switched number axis scale, the user slides the second axis scale with an accuracy of 100 to the position of 3600 corresponding to the second axis scale shown in FIG. 10.

Based on the same concept, the embodiments of the present disclosure also provide a number input apparatus.

It is understood that, in order to realize the above functions, the number input apparatus in the embodiments of the present disclosure includes hardware structures and/or software modules corresponding to each function. In combination with the units and algorithm steps of the examples disclosed in the embodiments of the present disclosure, the embodiments of the present disclosure are implemented in the form of hardware or a combination of hardware and computer software. Whether a certain function is executed by hardware or computer software-driven hardware depends on the specific application and design constraint conditions of the technical solution. Those skilled in the art uses different methods for each specific application to implement the described functions, but such implementation should not be considered as going beyond the scope of the technical solution of the embodiments of the present disclosure.

Figure 11:
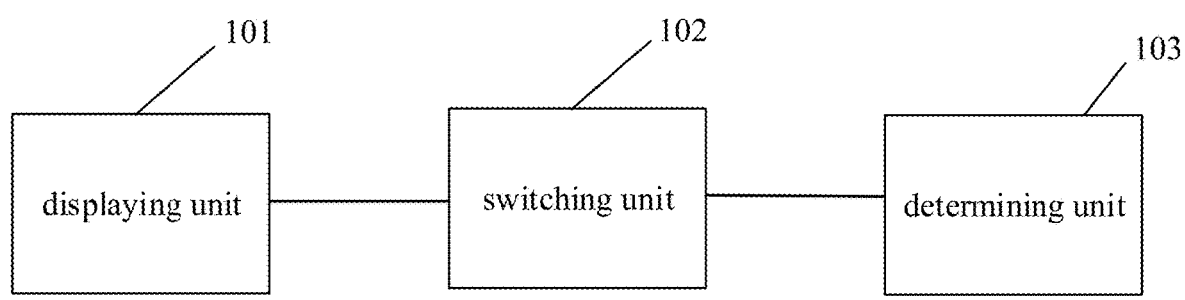
FIG. 11 is a block diagram of a number input apparatus according to an exemplary embodiment.

FIG. 11 is a block diagram of a number input apparatus according to an exemplary embodiment. As illustrated in FIG. 11, the number input apparatus 100 is applied to a terminal, the number input apparatus includes a displaying unit 101, a switching unit 102 and a determining unit 103. The displaying unit 101 is configured to display a number input control, in which the number input control includes a number axis, and the number axis includes a first axis scale.

The switching unit 102 is configured to receive a first touch operation on the number axis, and to switch the first axis scale to a second axis scale in response to the first touch operation meeting a preset condition. The determining unit 103 is configured to receive a second touch operation on the number axis, and to determine a target number according to a position on the second axis scale corresponding to the second touch operation, and to display the target number.

In an embodiment, the first touch operation includes a sliding operation on the number axis and/or a touch operation on the number axis. The first touch operation meeting the preset condition includes: detecting that a sliding speed of the sliding operation drops to a preset speed threshold, and/or continuously detecting the touch operation on the number axis, wherein a duration of the touch operation reaches a preset time threshold.

In an embodiment, the switching unit 102 switching the first axis scale to the second axis scale includes: decreasing a value of the first axis scale by a preset order of magnitude to obtain the second axis scale with an accuracy larger than an accuracy of the first axis scale.

In an embodiment, the number axis includes a first end point and a second end point, the first end point represents the smallest number on the number axis, and the second end point represents the largest number on the number axis, and the first touch operation includes a touch operation on any one of the first end point and the second end point. The first touch operation meeting the preset condition includes: determining that the first touch operation meets the preset condition in response to a continuous touch duration of the first end point or a continuous touch duration of the second end point reaching a preset second time threshold.

In an embodiment, switching the first axis scale to the second axis scale includes: increasing the value of the first axis scale by a preset order of magnitude to obtain the second axis scale with an accuracy less than an accuracy of the first axis scale.

In an embodiment, the determining unit 103 determining the target number according to a position on the second axis scale corresponding to the second touch operation includes: determining a number corresponding to a location of the first axis scale after the first touch operation is performed on the number axis; acquiring the second axis scale, and determining a number corresponding to a location of the second axis scale; and determining the target number based on the number corresponding to the location of the first axis scale and the number corresponding to the location of the second axis scale.

Regarding the apparatus in the foregoing embodiments, the specific manner in which each module performs the operation has been described in detail in the method embodiments, and detailed description will not be given here.

Figure 12:
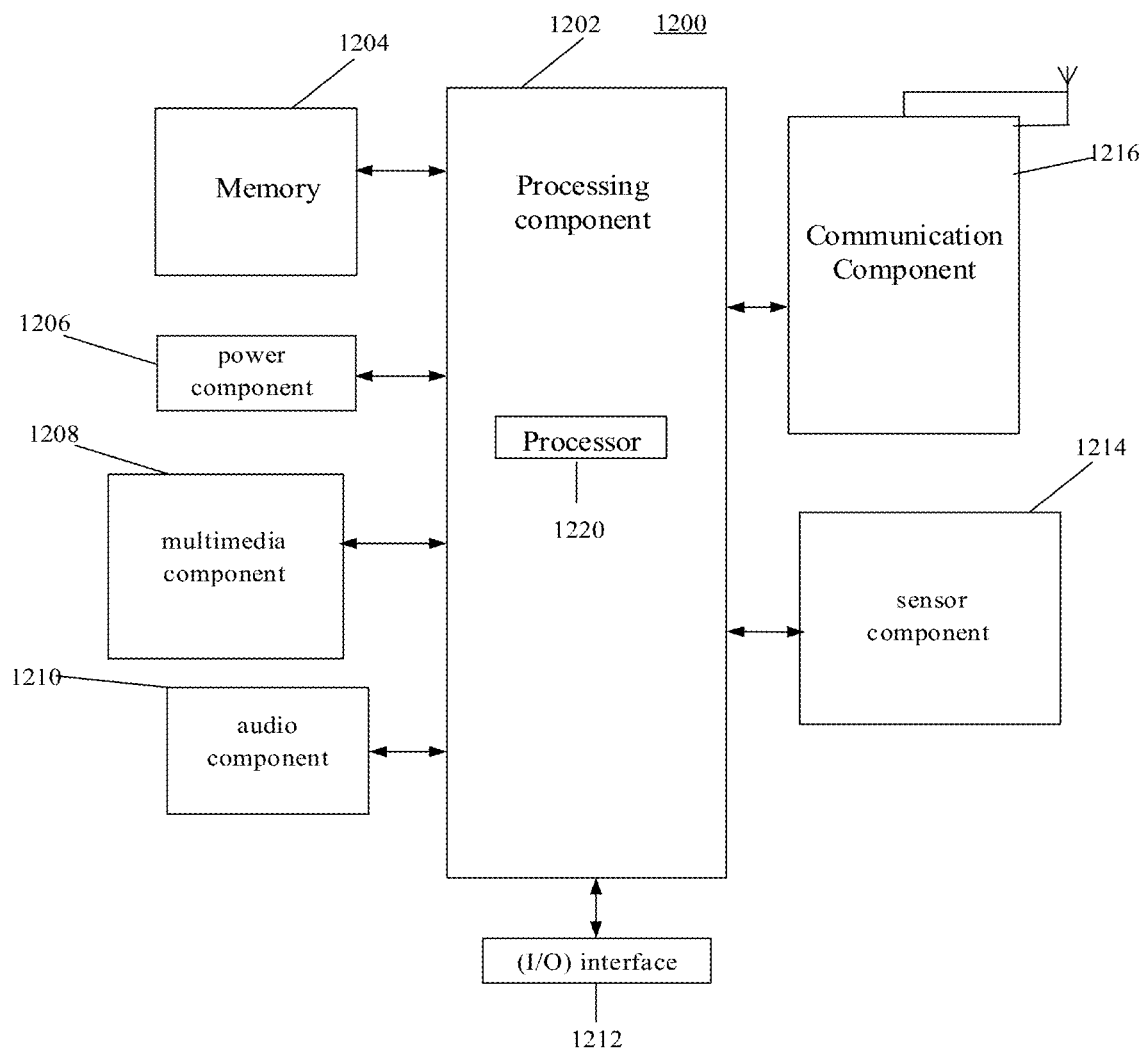
FIG. 12 is a block diagram of a number input apparatus according to an exemplary embodiment.

FIG. 12 is a block diagram of a number input apparatus 1200 according to an exemplary embodiment. For example, the apparatus 1200 may be a mobile phone, a computer, a digital broadcasting terminal, a message transceiver device, a game console, a tablet device, a medical device, a fitness device and a personal digital assistant.

Referring to FIG. 12, the apparatus 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the apparatus 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the apparatus 1200. Examples of such data include instructions for any applications or methods operated on the apparatus 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the apparatus 1200. The power component 1206 may include a power management system, one or more power sources, and any other components associated with the generation, management, and distribution of power in the apparatus 1200.

The multimedia component 1208 includes a screen providing an output interface between the apparatus 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front-facing camera and/or a rear-facing camera. When the apparatus 1200 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 1210 is configured to output and/or input audio signals. For example, the audio component 1210 includes a microphone (MIC) configured to receive an external audio signal when the apparatus 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the apparatus 1200. For instance, the sensor component 1214 may detect an open/closed status of the apparatus 1200, relative positioning of components, e.g., the display and the keypad, of the apparatus 1200, a change in position of the apparatus 1200 or a component of the apparatus 1200, a presence or absence of user contact with the apparatus 1200, an orientation or an acceleration/deceleration of the apparatus 1200, and a change in temperature of the apparatus 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the apparatus 1200 and other devices. The apparatus 1200 can access a wireless network based on a communication standard, such as WiFi, 2G, or 3G, or a combination thereof. In one exemplary embodiment, the communication component 1216 receives a broadcast signal or broadcast associated information from an external broadcast management system via a broadcast channel. In one exemplary embodiment, the communication component 1216 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the apparatus 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 1204, executable by the processor 1220 in the apparatus 1200, for performing the above-described methods. For example, the non-transitory computer-readable storage medium may be a ROM, a RAM, a CD-ROM, a magnetic tape, a floppy disc, an optical data storage device, and the like.

It is understood that in this disclosure, "plurality" refers to two or more, and other quantifiers are similar. In addition, it is noted that "and/or" in the text only describes a relation of the related objects and indicates three relations, for example, "A and/or B" indicates three conditions, i.e., A exists alone, A and B exist simultaneously, and B exists alone. The character "/" generally indicates that it is either the former related object or the latter related object. The singular forms "a", "said" and "the" are also intended to include the majority form unless the context clearly indicates other meanings.

It is further understood that terms such as "first" and "second" are used to describe various information, but the information should not be limited to these terms. These terms are only used to distinguish the same type of information from each other, and do not indicate a specific order or importance. In fact, the expressions "first" and "second" may be used interchangeably. For example, without departing from the scope of the present disclosure, the first information may also be referred to as the second information, and similarly, the second information may also be referred to as the first information.

It is further understood that unless otherwise specified, "connection" means that there is no direct connection between the two with other components, and there is an indirect connection between the two with other elements.

It is further understood that although the operations are described in a specific order in the drawings in the embodiments of the present disclosure, it should not be construed as requiring that the operations are performed in the specific order shown or in a serial order, or performed all to get the desired result. In certain environments, multitasking and parallel processing may be advantageous.

Those skilled in the art easily think of other embodiments of the present disclosure after considering the description and practicing the disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only, and the true scope and spirit of this disclosure are disclosed by the claims.

It should be understood that the present disclosure is not limited to the precise structure that has been described above and shown in the drawings, and various modifications and changes can be made without departing from the scope thereof. The scope of the present disclosure is limited only by the appended claims.

What is claimed is:

1. A number input method, for use with a display of a terminal, comprising:
    displaying a number input control, wherein the number input control comprises a number axis and a number indicator, and the number axis comprises a first axis scale, wherein the number indicator is movable along the number axis;
    receiving a first touch operation performed on the number indicator;
    determining a first number corresponding to the first axis scale at a location of the number indicator on the number axis;
    wherein the first touch operation comprises a sliding operation of sliding the number indicator along the number axis, in response to the first touch operation meeting a preset condition of detecting that a sliding speed of the sliding operation drops to a preset speed threshold, obtaining a second axis scale based on the first number by increasing an accuracy of the first axis scale by a preset order of magnitude;
    receiving a second touch operation on the number indicator within the second axis scale range, determining a second number corresponding to a location of the second touch operation within the second axis scale;
    displaying the second number; and
    in response to detecting a continuous touch on a first end point or a second end point of the second axis scale, switching the second axis scale to a third axis scale, wherein an accuracy of the second axis scale is higher than an accuracy of the third axis scale by the preset order of magnitude.

2. The method according to claim 1, wherein the first touch operation further comprises a touch operation on the number axis; and
    the first touch operation meeting the preset condition comprises:
    continuously detecting the touch operation on the number axis, wherein a duration of the touch operation reaches a preset time threshold.

3. The method according to claim 1, wherein the first end point represents the smallest number on the number axis, and the second end point represents the largest number on the number axis.

4. A number input apparatus, applied to a terminal with a display, comprising:
    one or more processors;
    a memory storing instructions executable by the one or more processors;
    wherein the one or more processors are configured to:
        display a number input control, wherein the number input control comprises a number axis and a number indicator, and the number axis comprises a first axis scale, wherein the number indicator is movable along the number axis;
        receive a first touch operation performed on the number indicator;
        determine a first number corresponding to the first axis scale at a location of the number indicator on the number axis;
        wherein the first touch operation comprises a sliding operation of sliding the number indicator along the number axis, in response to the first touch operation meeting a preset condition of detecting that a sliding speed of the sliding operation drops to a preset speed threshold, obtain a second axis scale based on the first number by increasing an accuracy of the first axis scale by a preset order of magnitude;
        receive a second touch operation on the number indicator within the second axis scale range, determine a second number corresponding to a location of the second touch operation within the second axis scale;
        display the second number; and
        in response to detecting a continuous touch on a first end point or a second end point of the second axis scale, switch the second axis scale to a third axis scale, wherein an accuracy of the second axis scale is higher than an accuracy of the third axis scale by the preset order of magnitude.

5. The apparatus according to claim 4, wherein the first touch operation further comprises a touch operation on the number axis; and
    the first touch operation meeting the preset condition comprises:
    continuously detecting the touch operation on the number axis, wherein a duration of the touch operation reaches a preset time threshold.

6. The apparatus according to claim 4, wherein the first end point represents the smallest number on the number axis, and the second end point represents the largest number on the number axis.

7. A non-transitory computer-readable storage medium, wherein when instructions stored in the storage medium are executed by a processor of a mobile terminal, the mobile terminal is caused to execute a number input method, and the method comprises:
    displaying a number input control, wherein the number input control comprises a number axis and a number indicator, and the number axis comprises a first axis scale, wherein the number indicator is movable along the number axis;
    receiving a first touch operation performed on the number indicator;

determining a first number corresponding to the first axis scale at a location of the number indicator on the number axis;

wherein the first touch operation comprises a sliding operation of sliding the number indicator along the number axis, in response to the first touch operation meeting a preset condition of detecting that a sliding speed of the sliding operation drops to a preset speed threshold, obtaining a second axis scale based on the first number by increasing an accuracy of the first axis scale by a preset order of magnitude;

receiving a second touch operation on the number indicator within the second axis scale range, determining a second number corresponding to a location of the second touch operation within the second axis scale;

displaying the second number; and in response to detecting a continuous touch on a first end point or a second end point of the second axis scale, switching the second axis scale to a third axis scale, wherein an accuracy of the second axis scale is higher than an accuracy of the third axis scale by the preset order of magnitude.

* * * * *